United States Patent [19]

Dzung et al.

[11] 4,418,830
[45] Dec. 6, 1983

[54] MOISTURE AND DUST SEAL ARRANGEMENT FOR A PORTABLE RADIO OR THE LIKE

[75] Inventors: John C. Dzung, Sunrise; Harry J. Perkey, Tamarac; George J. Schmitz, Plantation, all of Fla.

[73] Assignee: Motorola, Inc., Schaumburg, Ill.

[21] Appl. No.: 296,718

[22] Filed: Aug. 27, 1981

[51] Int. Cl.³ .................. B65D 53/02; B65D 43/06
[52] U.S. Cl. .................. 220/81 R; 220/4 B; 220/358; 220/378
[58] Field of Search .......... 220/4 R, 4 B, 81 R, 220/355, 358, 378, 359

[56] References Cited

U.S. PATENT DOCUMENTS

| | | |
|---|---|---|
| 2,746,824 | 5/1956 | Bond . |
| 3,144,162 | 8/1964 | Morris ............................. 220/378 |
| 3,162,813 | 12/1964 | Piccinini . |
| 3,258,151 | 6/1966 | Gasche ............................. 220/378 |
| 3,260,360 | 7/1966 | Davis ............................. 220/4 R |
| 3,346,812 | 10/1967 | McKenna et al. . |
| 3,985,977 | 10/1976 | Beaty et al. . |
| 3,997,819 | 12/1976 | Eggert et al. . |
| 4,225,970 | 9/1980 | Jaramillo et al. . |

Primary Examiner—George E. Lowrance
Attorney, Agent, or Firm—James W. Gillman; Edward M. Roney; Donald B. Southard

[57] ABSTRACT

An improved moisture and dust seal assembly is disclosed which is especially suited for application in small hand-held radio apparatus or the like which includes a molded plastic enclosure. A vertical wall is provided on one of the mating members forming the enclosure, such as the cover. The wall has essentially right angle corners and is adapted to receive a standard O-ring thereabout. The assembly is completed by affixing a ribbon-like member, in the form of a closed loop, to the top of the verticle wall. The ribbon-like member extends a predetermined distance beyond the edge of the verticle wall to form a groove-like space for retaining the O-ring. The ribbon-like member may be affixed to the top of the wall by a convenient heat staking operation.

4 Claims, 3 Drawing Figures

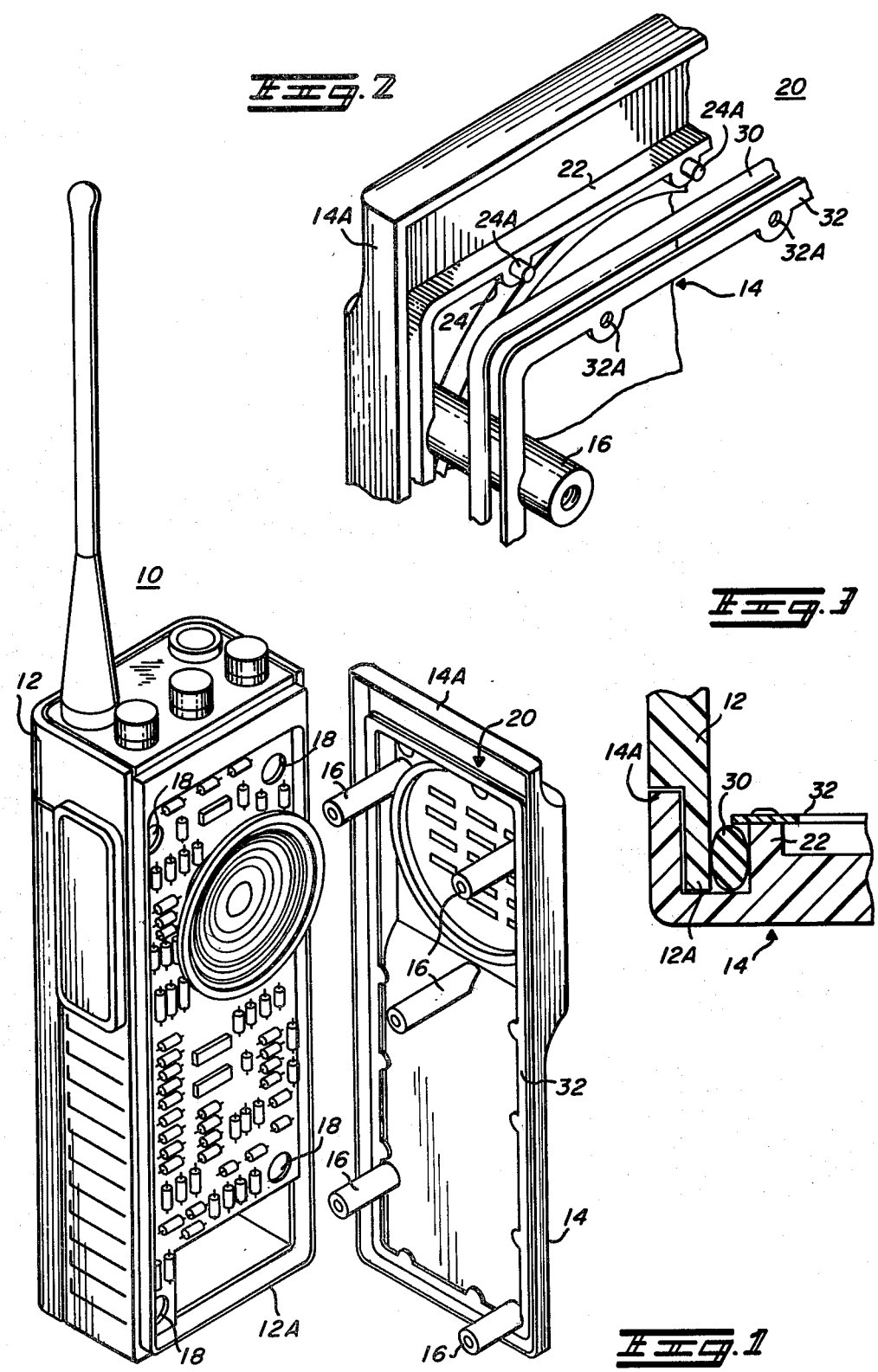

4,418,830

MOISTURE AND DUST SEAL ARRANGEMENT FOR A PORTABLE RADIO OR THE LIKE

BACKGROUND OF THE INVENTION

The present invention relates in general to sealing arrangements and more particularly to an improved enclosure moisture and dust seal assembly especially suited for application in personalized, hand-held radio apparatus which includes a molded plastic enclosure.

In portable radio equipment, as well as many other applications, seal arrangements are included to block out moisture and dust so as to protect the internal component parts thereof.

Probably the most prevelent is the use of a formed gasket which fits snuggly into a provided groove and which is compressed to a required degree by a continuous tongue included on a mating part, such as a cover or the like. However, it will be appreciated that the gasket structure is relatively expensive and particularly so since it is specifically designed to fit but one contour, and thus has but one practical application. Moreover, such gaskets are frequently spliced together by adhesive, as well as requiring still additional adhesive for affixing and retaining the gasket in place. Build up of adhesive of course effects undesirable tolerences. In addition, seal effectiveness of the gasket remains largely a function of how tight the apparatus fasteners are, which control the degree of compression of the gasket.

It must also be kept in mind that gaskets of any type wear out with time and accordingly require field replacement. Gaskets that are glued in place are difficult to replace for that reason alone.

One alternative to the use of gaskets of the foregoing type has been the standard O-ring. O-rings are elastic and thus are easy to set in place. Conventionally they are seated in a formed groove effected in the apparatus during its molding operation. The assembly process then is relatively simple because the O-ring has a uniform shape, a uniform cross-section, and may be fabricated of an impregnated lubricant compound. The O-ring is always less expensive than a specially designed gasket arrangement. Moreover, its effectiveness is not determined by fastener tightness. It might also be pointed out that it additionally minimizes the human factors involved in an otherwise relatively complicated assembly operation.

However, the O-ring is not always suited to every application. This is particularly so regarding small, hand-held personalized apparatus having a molded plastic housing. This is because the O-ring must be seated in formed groove. If the enclosure is relatively large there is little difficulty in providing for such groove in the molding operation of the housing. Below a certain size, however, it is in fact difficult, and in certain instances, impossible to mold in such grooves because of the tooling involved and other factors. One solution to the molding problem is simply to provide a flat surface with essentially right angle corners, instead of the formed groove and wherein the O-ring structure is glued firmly in place at such right angle corners. This is as undesirable, in terms of difficulty of field replacement, as the glued-in contoured gasket arrangement.

SUMMARY OF THE INVENTION

Accordingly, it is an object of the present invention to provide an improved moisture and dust seal for an enclosure of an apparatus which overcomes the foregoing deficiencies.

A more particular object of the present invention is to provide an improved moisture and dust seal for an enclosure which utilizes an O-ring that does not require a formed molded-in groove nor that the O-ring itself must be glued in place, which greatly facilitates easy and convenient replacement.

In practicing the invention, an improved moisture and dust seal arrangement is provided for a miniturized radio apparatus or the like which includes a molded plastic housing or an enclosure formed by two mating members, i.e., a base and a cover. One of the two mating enclosure members includes an upstanding vertical wall in the form of a closed loop with a plurality of right angle corners. An O-ring is positioned about the upstanding wall and retained therein by the elasticity of the O-ring. To complete the assembly, a flat ribbon-like member in the form of a closed loop is positioned to overlie the vertical wall and extend a predetermined distance outwardly from the edge thereof. The vertical wall and overlying ribbon-like member form a groove-like space to retain the O-ring. The ribbon-like member is affixed to the top of the vertical wall by a suitable method, such as by heat staking. The seal is effected then by a wall portion of the other enclosure member which when mating with said one member causes the O-ring to be compressed between the two referenced vertical walls thereof.

BRIEF DESCRIPTION OF THE DRAWINGS

The features of this invention which are believed to be novel are set forth with particularity in the appended claims. The invention itself, however, together with further object and advantages thereof, may be best understood by reference to the following description when taken in conjunction with the accompanying drawings in which:

FIG. 1 is a view in perspective of a radio apparatus with front cover, which cover includes a seal arrangement which has been constructed in accordance with the present invention:

FIG. 2 is partial enlarged exploded view of the front cover showing the moisture and dust seal assembly and;

FIG. 3 is a fragmentary and cross-section view of the cover showing the constituent parts of the improved moisture and dust seal arrangement.

DESCRIPTION OF THE PREFERRED EMBODIMENT

Refering now to the drawings, a miniturized, hand-held radio apparatus 10 is shown which incorporates the improved moisture and dust seal arrangement of the present invention. It is understood, however, that the inventive seal assembly is not limited to such portable radios but has a widespread application potential. The portable radio 10 includes a base 12 for retaining the various component parts therein. The radio 10 also includes a mating top cover or lid 14 which mates with the base 12 in an entirely conventional manner. That is, the cover 14 has a lip 14A which fits over and mates with, the outer edge or lip 12A of base 12. A plurality of posts or stantions 16 affixed to cover 12 are designed to insert through appropriate apertures 18. The free end of the post 16 are threaded to accept a machine screw fastners (not shown) inserted through appropriate apertures in the bottom of the base 12, so as to maintain base 12 and cover 14 fitted together in an assembled relation.

As indicated, cover 14 includes a moisture and dust seal arrangement 20 on the underside thereof. The seal assembly is in the form of a closed loop, as illustrated, with four essentially right angle corners. As shown more clearly in FIG. 2, the seal assembly comprises an upstanding vertical wall 22 formed in the interior or backside of cover 14 a predetermined distance from the inturned lip 14A. A series of stake post or pillars 24 are positioned at appropriate locations about the wall 22. Each of these posts includes a reduced nipple portion 24A at the top end.

O-ring 30 is positioned about the wall 22 in the space between the wall and the inturned lip 14A (best seen in FIG. 3). The O-ring is appropriately dimensioned such that a slight stretching is required for it to fit around the wall 22 and be retained within the referenced space. Preferably, the O-ring is made of an inpregnated lubricant compound and has a substantially uniform shape and cross-section.

To complete the assembly, a flat ribbon-like member 32, in the shape of a closed loop, is provided which is dementioned to overlie the top of the vertical edge of the wall 22 and extend a predetermined distance outwardly from the edge thereof in the space between the wall 22 and lip 14A. By member 32 extending beyond the edge of wall 22, a groove-like space is provided between the wall 22 and lip 14A so as to retain the O-ring 32 in its desired position and from where it can be removed only by stretching it beyond the edge of member 32. Accordingly, no adhesive is required for O-ring 30 and it may be replaced at any time, easily and conveniently.

To permanently affix member 32 to the top of wall 22, the reduced neck portions 24A of posts 24 extend into corresponding apertures 32A of member 32. Neck portion 24A may then be heat staked by a soldering iron or the like to melt the plastic and form a permanent fastening means for member 32 A. It is of course obvious that other methods of securing the member 32 are available, such as by screws extending through apertures 32A and corresponding threaded openings in posts 24. Still other methods will come to mind as well.

In effecting the sealing action, as shown in FIG. 3, the lip portion 12A of the base 12 inserts between the inturn lip 14A of cover 14 such that the O-ring 30 is effectively compressed between the lip 12A and the vertical wall 22. As mentioned previously, the O-ring 32 preferably is made of an impregnated lubricant compound so that friction on its surface is held to a minimum to facilitate the sliding action of the lip 12A in the closure operation of the cover 14 on base 12.

Accordingly, it will be appreciated that an improved moisture and dust seal assembly has been disclosed which is especially suited for application in a small, hand-held personalized radio apparatus or the like which includes a molded plastic enclosure. Requirement for a molded-in groove during molding operations for retaining an O-ring has been eliminated. Instead, a flat vertical wall is provided as a closed loop with a plurality of right angle corners around which the O-ring may be positioned and held in place by an overhanging ribbon-like member affixed to the top of the wall. The O-ring is effectively retained in its intended place, but may easily and conveniently be replaced at any time simply by stretching it beyond the edge of the overhanging top portion. Expensive single-application gaskets are avoided and the assembly operation of the seal assembly is easily effected by no more than a simple heat staking operation.

What is claimed is:

1. An improved moisture and dust seal arrangement for an apparatus having a molded plastic enclosure formed by first and second mating members, including in combination:

an inturned lip and an inwardly spaced upstanding vertical wall included on one of the enclosure members in the form of a closed loop configuration and spaced from the outer edge of said one enclosure member, a plurality of right angle corners and a plurality of stake posts positioned about said closed loop vertical wall;

an O-ring positioned about the upstanding vertical wall and retained thereon by the elasticity of the O-ring; and a flat ribbon-like member in the form of a closed loop overlying said vertical wall and cooperating with said stake posts to comprise an assembly wherein a portion extends outwardly a predetermined distance from the edge of said wall in a manner to form a groove-like space to retain said O-ring; and said other enclosure member having an outer edge lip portion received in said space between said inturned lip of said one enclosure member and said O-ring positioned about said upstanding vertical wall to compress said O-ring in a lateral direction and form an effective moisture and dust seal.

2. An improved moisture and dust seal arrangement in accordance with claim 1 wherein said plurality of stake posts include reduced neck portions for extending into corresponding apertures in said ribbon-like member.

3. An improved moisture and dust seal arrangement in accordance with the claim 2 wherein said neck portions are melted by heat staking to permanently affix said ribbon-like member to the top of such vertical wall.

4. An improved moisture and dust seal arrangement in accordance with claim 1 wherein said O-ring is fabricated from an impregnated lubricant compound.

* * * * *